(12) United States Patent
Ryu

(10) Patent No.: US 8,169,462 B2
(45) Date of Patent: May 1, 2012

(54) MOBILE COMMUNICATION DEVICE CAPABLE OF STORING VIDEO CHATTING LOG AND OPERATING METHOD THEREOF

(75) Inventor: Jae Hun Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 1041 days.

(21) Appl. No.: 12/110,149

(22) Filed: Apr. 25, 2008

(65) Prior Publication Data

US 2008/0266378 A1    Oct. 30, 2008

(30) Foreign Application Priority Data

Apr. 26, 2007    (KR) .................. 10-2007-0040906

(51) Int. Cl.
*H04N 7/14* (2006.01)
(52) U.S. Cl. .................. 348/14.02; 348/14.08
(58) Field of Classification Search .......... 348/14.01, 348/14.02, 14.08; 379/88.13, 88.17; 709/204, 709/206, 207; 370/260; 455/556.1, 566, 455/518, 412.1
See application file for complete search history.

(56) References Cited

U.S. PATENT DOCUMENTS

| 2002/0093531 A1 | 7/2002 | Barile |
| 2003/0054802 A1 | 3/2003 | Xie |
| 2005/0208962 A1 | 9/2005 | Kim |
| 2006/0085515 A1 | 4/2006 | Kurtz et al. |
| 2006/0236247 A1 | 10/2006 | Morita et al. |
| 2007/0053308 A1 | 3/2007 | Dumas et al. |

FOREIGN PATENT DOCUMENTS

| CN | 1518326 A | 8/2004 |
| CN | 1805534 A | 7/2006 |
| EP | 1172990 A1 | 1/2002 |
| GB | 2372402 A | 8/2002 |
| JP | 2007-025936 A | 2/2007 |

OTHER PUBLICATIONS

Anonymous, "How to Use Skype Chat", Skype help guidelines (Online), Feb. 12, 2007, 7 pages, XP002623362, URL: http://imet.csus.edu/imet9/portfolio/rexius_lani/286_project/using_skype_chat.pdf.
Rexius, "Skype—An Emerging Technology", Skype (Online), Feb. 16, 2007, 14 pages, XP002623361, URL: http//imet.csus.edu/imet9/portfolio.rexius_lani/286_project/skype.pdf.

*Primary Examiner* — Tuan Nguyen
(74) *Attorney, Agent, or Firm* — Birch, Stewart, Kolasch & Birch, LLP

(57) ABSTRACT

A mobile communication device including a radio communication unit configured to establish a video telephony call between a first user of the mobile communication device and at least a second user of another communication device, a display unit configured to display a first image data of the first user and a second image data of the second user on the mobile communication device, and to display a chatting window on the mobile communication device when a video chatting service is selected such that the first and second users can perform a chatting operation in the chatting window, in which the first and second image data are transmitted/received through the video telephony call, a control unit configured to link chatting data displayed in the chatting window with at least one of the first image data of the first user and the second image data of the second user, and a memory unit configured to store the linked chatting data as a video chatting log.

28 Claims, 17 Drawing Sheets

MOBILE COMMUNICATION DEVICE CAPABLE OF STORING VIDEO CHATTING LOG AND OPERATING METHOD THEREOF

CROSS-REFERENCE TO A RELATED APPLICATION

The present application claims the benefit of Korean Application No. 10-2007-40906, filed on Apr. 26, 2007, in the Korean Intellectual Property Office, the disclosure of which is incorporated herein by reference.

BACKGROUND OF THE INVENTION

1. Field of the Invention

The present invention relates to a mobile communication device and corresponding method in which at least one of a user's image data and a counterpart user's image data in a video telephony call is linked and stored with chatting data corresponding to a chatting session during the video telephony call.

2. Discussion of Related Art

Video calls between mobile terminals are becoming possible using the High Speed Downlink Packet Access (HSDPA) standard. Thus, users communicating on the terminals are able to see video images of each other and are also able to send and receive data between each other. For example, the users can perform a chatting session (e.g., Instant message service) in real time while performing a video call with each other.

Further, the video chatting service allows text to be exchanged in real-time without using an additional packet switched network during a 3G-324M-based video telephony call, because the chatting service uses a circuit switched domain based on the 3G-324M standard. That is, the video chatting service uses only a mandatory protocol in the 3G-324M format, and therefore can be easily implemented if message rules defined in a chatting service are met in the existing 3G-324M protocol.

Thus, a mobile terminal user is now able to chat with several other users. Therefore, because the user often conducts several chat sessions a day, there is a need for efficiently managing and storing information related to the different chat sessions.

SUMMARY OF THE INVENTION

Accordingly, one object of the present invention is to address the above-noted and other problems.

Another object of the present invention is to provide a mobile communication device and corresponding method in which at least one of an image of a user placing a video call (user's image data) and an image of a user receiving the video call (counterpart user's image data) are linked and stored with the particular chat session.

To achieve these and other advantages and in accordance with the purpose of the present invention, as embodied and broadly described herein, the present invention method includes establishing a video telephony call between a first user and at least a second user, displaying a first image data of the first user and a second image data of the second user on the mobile communication device, in which the first and second image data are transmitted/received through the video telephony call, displaying a chatting window on the mobile communication device when a video chatting service is selected such that the first and second users can perform a chatting operation in the chatting window, linking chatting data displayed in the chatting window with at least one of the first image data of the first user and the second image data of the second user, and storing the linked chatting data as a video chatting log.

In another aspect, the present invention provides a mobile communication device including a radio communication unit configured to establish a video telephony call between a first user of the mobile communication device and at least a second user of another communication device, a display unit configured to display a first image data of the first user and a second image data of the second user on the mobile communication device, and to display a chatting window on the mobile communication device when a video chatting service is selected such that the first and second users can perform a chatting operation in the chatting window, in which the first and second image data are transmitted/received through the video telephony call, a control unit configured to link chatting data displayed in the chatting window with at least one of the first image data of the first user and the second image data of the second user, and a memory unit configured to store the linked chatting data as a video chatting log.

Further scope of applicability of the present invention will become apparent from the detailed description given hereinafter. However, it should be understood that the detailed description and specific examples, while indicating preferred embodiments of the invention, are given by illustration only, since varous changes and modification within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The present invention will now be described in detail in connection with specific embodiments with reference to the accompanying drawings.

Figure 1:
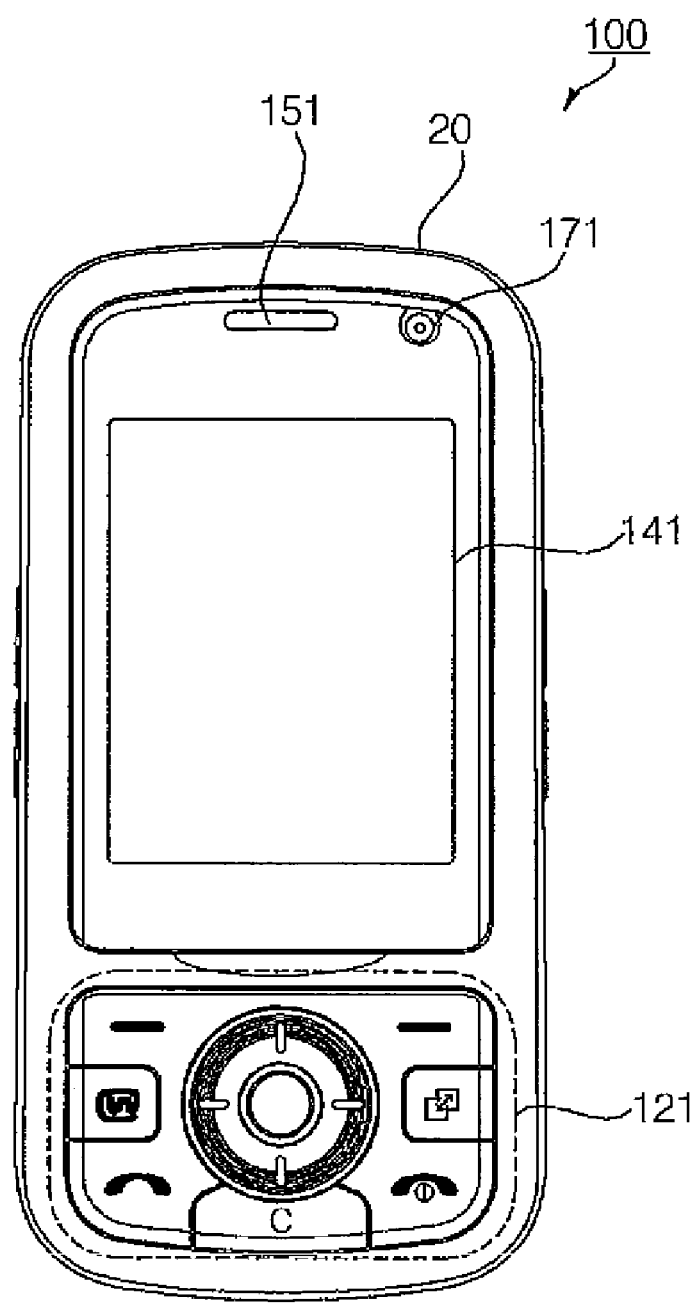
FIG. 1 is an overview illustrating an external shape of a mobile communication device in a closed position according to an embodiment of the present invention.
Figure 2:
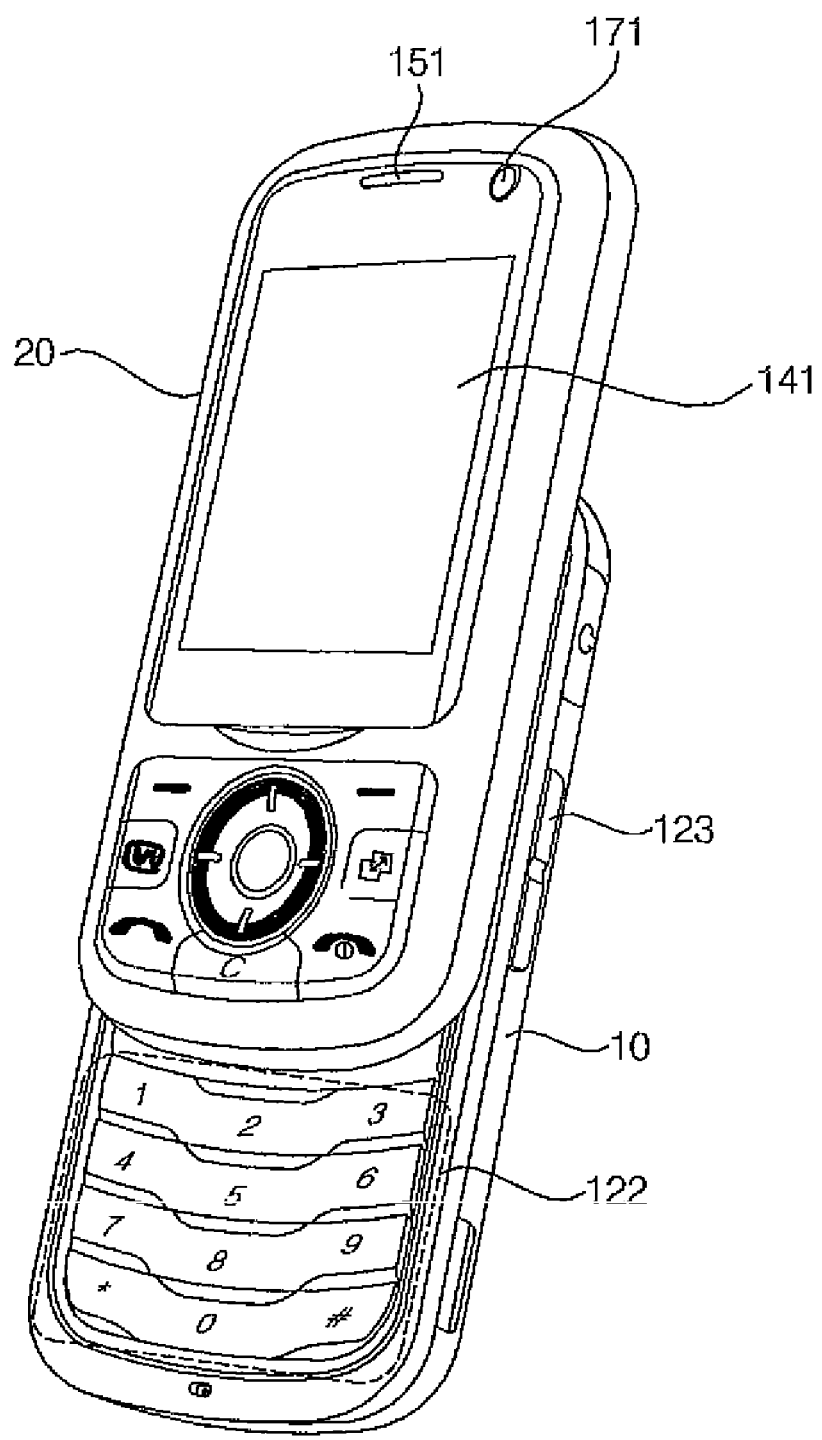
FIG. 2 is an overview illustrating an external shape of a mobile communication device in an opened position according to an embodiment of the present invention.

FIGS. 1 and 2 are overviews respectively illustrating an external shape of a mobile communication device 100 in closed and open positions according to an embodiment of the present invention. As shown, the mobile communication device 100 includes a main body 10, and a cover 20 coupled to the main body 10 in a sliding manner. The cover 20 is equipped with a display window 141 such as a Liquid Crystal Display (LCD), a speaker 151 for outputting a counterpart user's voice, etc., a camera 171 for capturing an image of a user during a video telephony call, and a manipulation key 121 for selection a call, call end, menu select options and so on.

Further, the main body 10 includes a keypad 122, and a volume key 123 for controlling the call volume, etc. disposed on the side of the main body 10. The mobile device 100 may also include an additional camera (camera 173 in FIG. 3) disposed on a backside of the main body 10 to capture an image of a user in a different direction than that of the camera 171.

Figure 3:
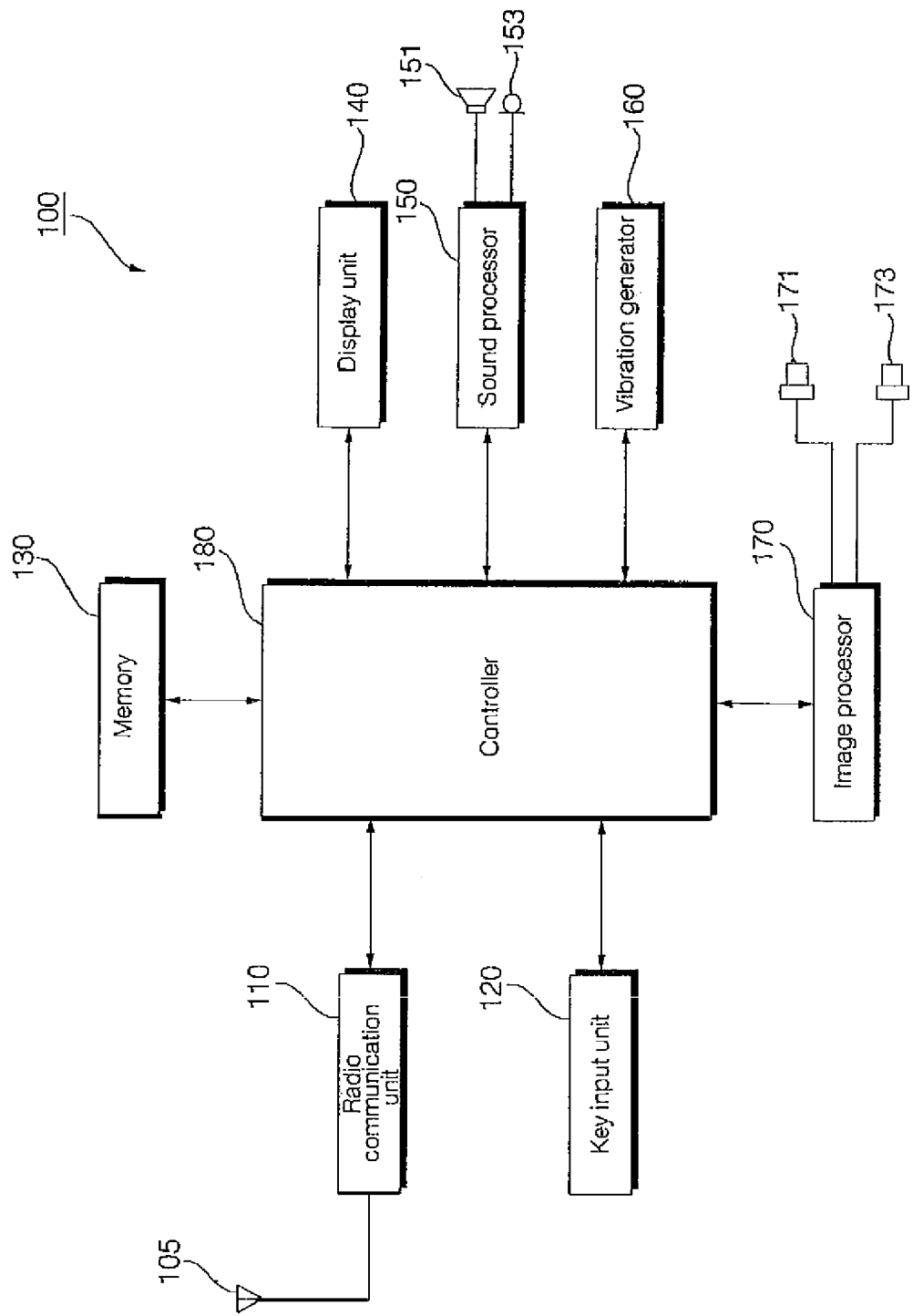
FIG. 3 is a block diagram of a mobile communication device according to an embodiment of the present invention.

Next, FIG. 3 is a block diagram of the mobile communication device 100 according to an embodiment of the present invention. As shown, the mobile communication device 100 includes a radio communication unit 110, a key input unit 120, memory 130, a display unit 140, a sound processor 150, a vibration generator 160, an image processor 170, and a controller 180. The radio communication unit 110 provides an interface for radio communication with a base station through an antenna 105, and includes a duplex filter for separating transmitting/receiving signals from the antenna 105, a power amplifier for amplifying a transmitting signal, a frequency uplink conversion circuit of a transmission path, a frequency downlink conversion circuit of a reception path, and so on.

In addition, the key input unit 120 includes a number of keys such as numeric keys and function keys and also includes the keypad 122. Further, the key input unit 120 is configured to transfer a signal corresponding to a key pressed by a user to the controller 180 so that a user's commands, data, etc. is input to the communication device 100. The memory 130 stores program or data used for operating the mobile communication device 100, various data input or received by the user, etc. The memory 130 also stores a video chatting log.

Also, the display unit 140 is equipped with the display window 141, such as an LCD, and displays menus the user uses for operating and controlling the mobile device 100. The display unit 140 also displays a status of a received or placed call, battery information, information about the operating state of the mobile communication device according to a command input by a user, and so on. The display unit 140 also displays the user's and counterpart user's image data during a video telephony call, a chatting window at the time of a video chatting service, a chatting input window for inputting chatting data, and the like. The display unit 140 may also include a touch screen.

Further, the sound processor 150 amplifies a sound signal output from the controller 180 and outputs an amplified signal to the speaker 151, or electrically converts a sound signal input through a microphone 153, etc., into an electrical signal and transfers a converted signal to the controller 180. In addition, the vibration generator 160 generates a vibration signal when a call is received in a vibration mode under the control of the controller 180. The vibration generator 160 may also generate a vibration signal in response to the reception of a signal corresponding to a predetermined special symbol even during a video chatting service.

In addition, the image processor 170 includes the cameras 171 and 173 for capturing an image of the caller during the video telephony call. The image processor 170 converts electrical image signals captured by the cameras 171 and 173 into coded video data through an image process, such as an analog/digital conversion and image coding process, and transfers the converted data to the controller 180. The image processor 170 can also decode coded and stored video data and then convert the video data into a reproducible signal.

Further, the controller 180 controls an overall operation of the mobile communication device by controlling an operation of each element. In particular, when a video chatting service is selected during a video telephony call, the controller 180 controls the display unit 140 to display the chatting window and the chatting input window so that the user can video chat with another user. Also, the controller 180 links at least one of the image of the caller and the image of the called party with chatting data transmitted/received through the video chatting service and then stores the linked information in the memory 130.

Figure 4:
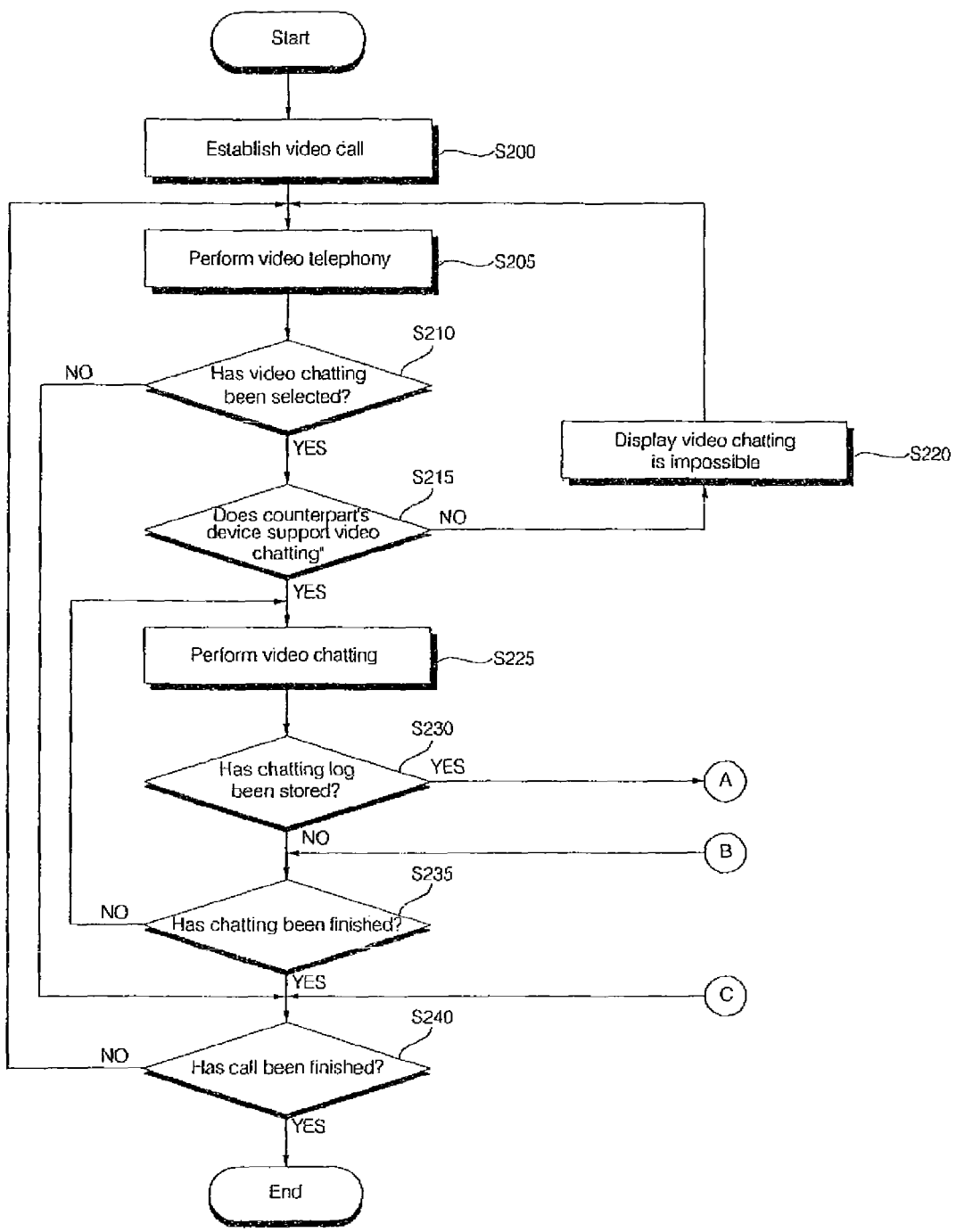
FIGS. 4 and 5 are flowcharts illustrating a method of storing a video chatting log in a mobile communication device according to an embodiment of the present invention.
Figure 5:
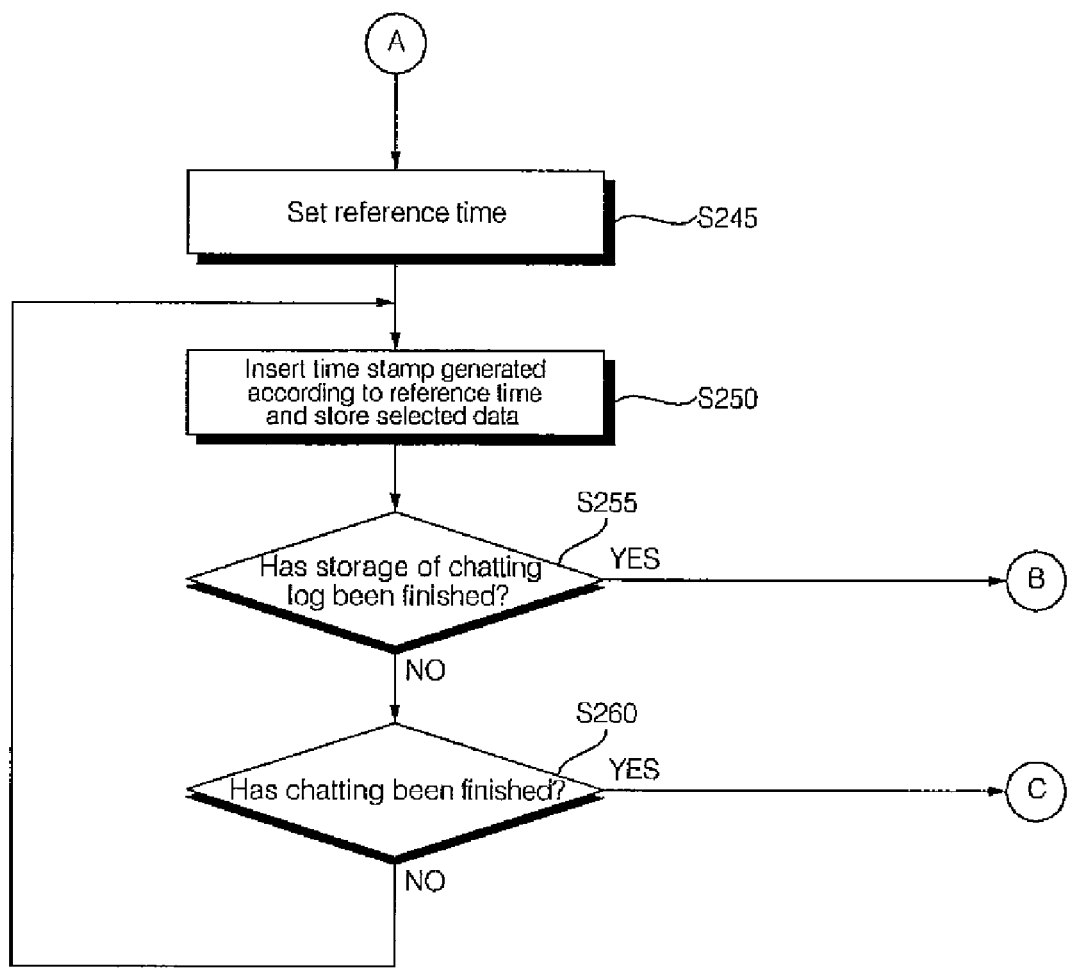

Next, FIGS. 4 and 5 are flowcharts illustrating a method of storing a video chatting log in a mobile communication device according to an embodiment of the present invention. FIG. 3 will also be referred to in this description. Referring to FIG. 4, when the user requests a video telephony call by inputting the counterpart user's phone number in a video telephony call menu or by selecting a predetermined shortcut key for video telephony, the controller 180 controls the radio communication unit 110 to establish a video call to the counterpart user's device according to the input telephone number (step S200).

The controller 180 then performs the video telephony call between the two (or more) users (step S205). Further, the controller 180 controls the display unit 140 to display the image data of the calling and called parties. The voice of the called party is also output through the speaker 151. The controller 180 then determines if the user has requested a video chatting service during the video telephony call (step S210). If the user has requested the video chatting service (Yes in step S210), the controller 180 determines whether the counterpart user's device supports video chatting (step S215).

The controller 180 can determine whether or not the counterpart user's device supports video chatting by transmitting a predetermined engage message and receiving a predetermined response message in response. If the controller 180 determines the counterpart user's device does not support the video chatting service (No in step S215), the controller 180 controls the display unit 140 to display a message indicating that video chatting is not possible (step S220) and continues to perform the video telephony call in step S205.

If the controller 180 determines the counterpart user's device does support the video chatting service (Yes in step S215), the controller 180 controls the display unit 140 to display a chatting window on which data transmitted through the video chatting service is displayed and to display a chatting input window on which data input through the chatting window is displayed (step S225).

Further, when the chatting window and the chatting input window are displayed, the images of the calling and called parties are preferably reduced in size on the display unit 140. The users can then chat with each other using the chatting window and chatting input window. In addition, the controller 180 also determines if a chatting log has been stored (step S230), and if so (Yes in S230), the controller 180 sets a reference time in step S245, as shown in FIG. 5.

Then, as shown in FIG. 5, the controller 180 generates and stores a time stamp according to the reference time along with data corresponding to video chatting log (step S250). At this time, the chatting data can be stored by default, and data stored together with the chatting data can be selected according to a user's command. For example, the data stored together with the chatting data may be selected by selecting the counterpart's image data, the counterpart's voice data, the user's image data, and the user's voice data before the video chatting service or during the video chatting service.

The time stamp includes time information used to synchronize chatting data and data stored together with the chatting data. The time stamps can be stored together with the chatting data or separately from the chatting data at predetermined intervals. Therefore, periods where the same time information is recorded can be matched to each other for synchronization by reference to the time stamps at a time of play.

Thus, the data stored as a video chatting log includes a time stamp that is set based on a reference time. The data including the time stamp can be synchronized to other data based on the included time stamp at the time of play. Further, a storage time point and a storage section can also be set to data, which are linked to the chatting data and stored, based on a user command. Also, the storage of the video chatting log is performed until the end of the chatting log storage process (step S255) and the chatting is finished (step S260).

Figure 6:
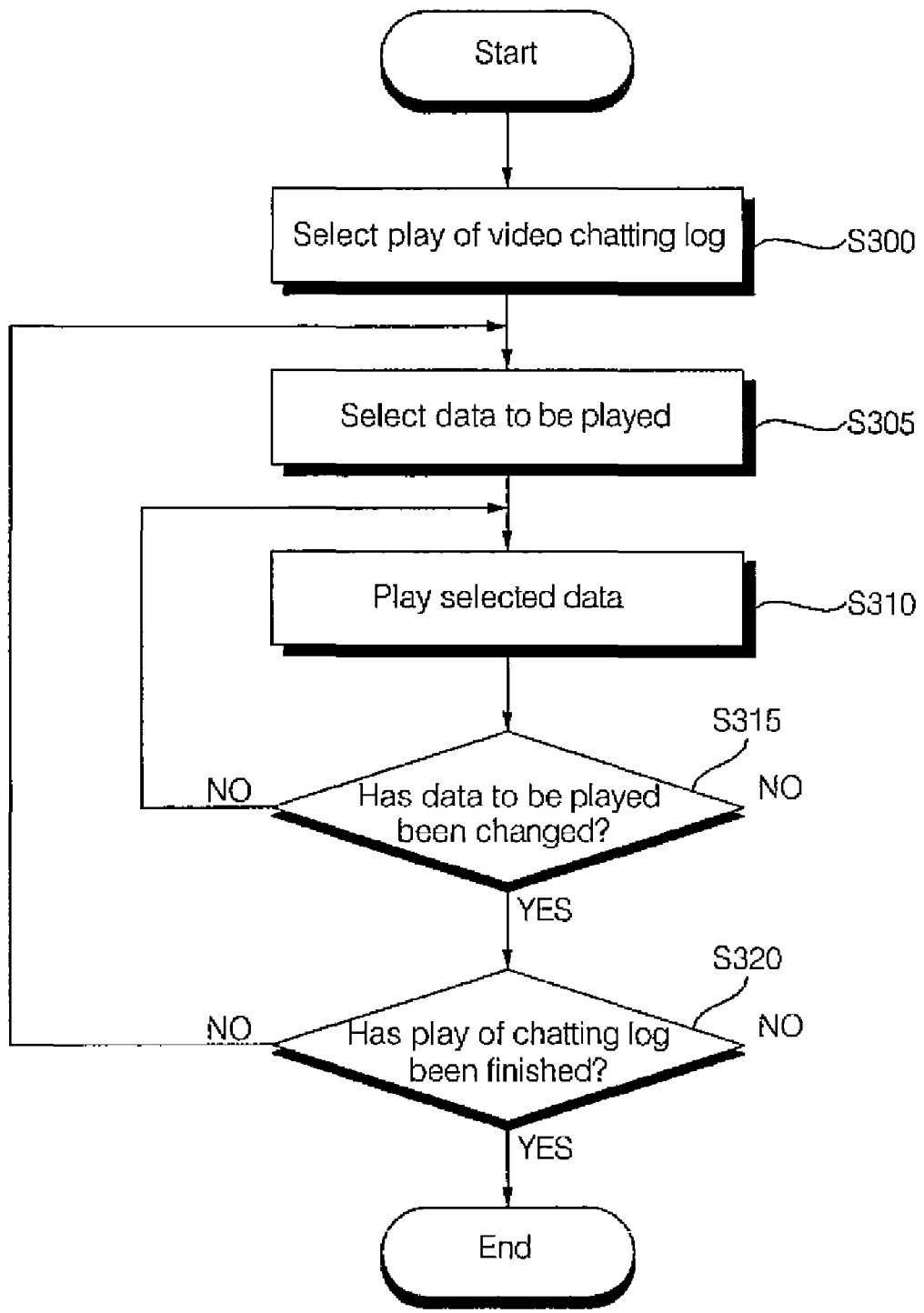
FIG. 6 is a flowchart illustrating a method of playing a stored video chatting log in a mobile communication device according to an embodiment of the present invention.

Next, FIG. 6 is a flowchart illustrating a method of playing a stored video chatting log in a mobile communication device according to an embodiment of the present invention. As shown, when the user requests the stored video chatting log be played (step S300), the controller 180 controls the display unit 140 to display a menu that provides selectable reproducible data such that the user can select a particular chatting log to be played (step S305). When the user selects a particular chatting log, the controller 180 plays the selected data (step S310).

Further, when playing the chatting data, the controller 180 can play only the chatting data, or can play the chatting data and display one of the user's image data or the counterpart user's image data. The controller 180 can also play the data in a variety of ways such as playing the user's image data and voice data and chatting data, etc.

The controller 180 also determines if the data to be played has been changed (step S315), and whether the playing of the chatting data has been finished (step S320). If the controller 180 determines the chatting data has been finished (Yes in step S320), the process ends.

Through this process, chatting data, and a selected one of video data and voice data transmitted/received through video telephony can be played together. When a counterpart user's image data is stored together with the video chatting log, the controller 180 may also inform the user of the counterpart device that their image is being stored together with the chatting data.

Figure 7:
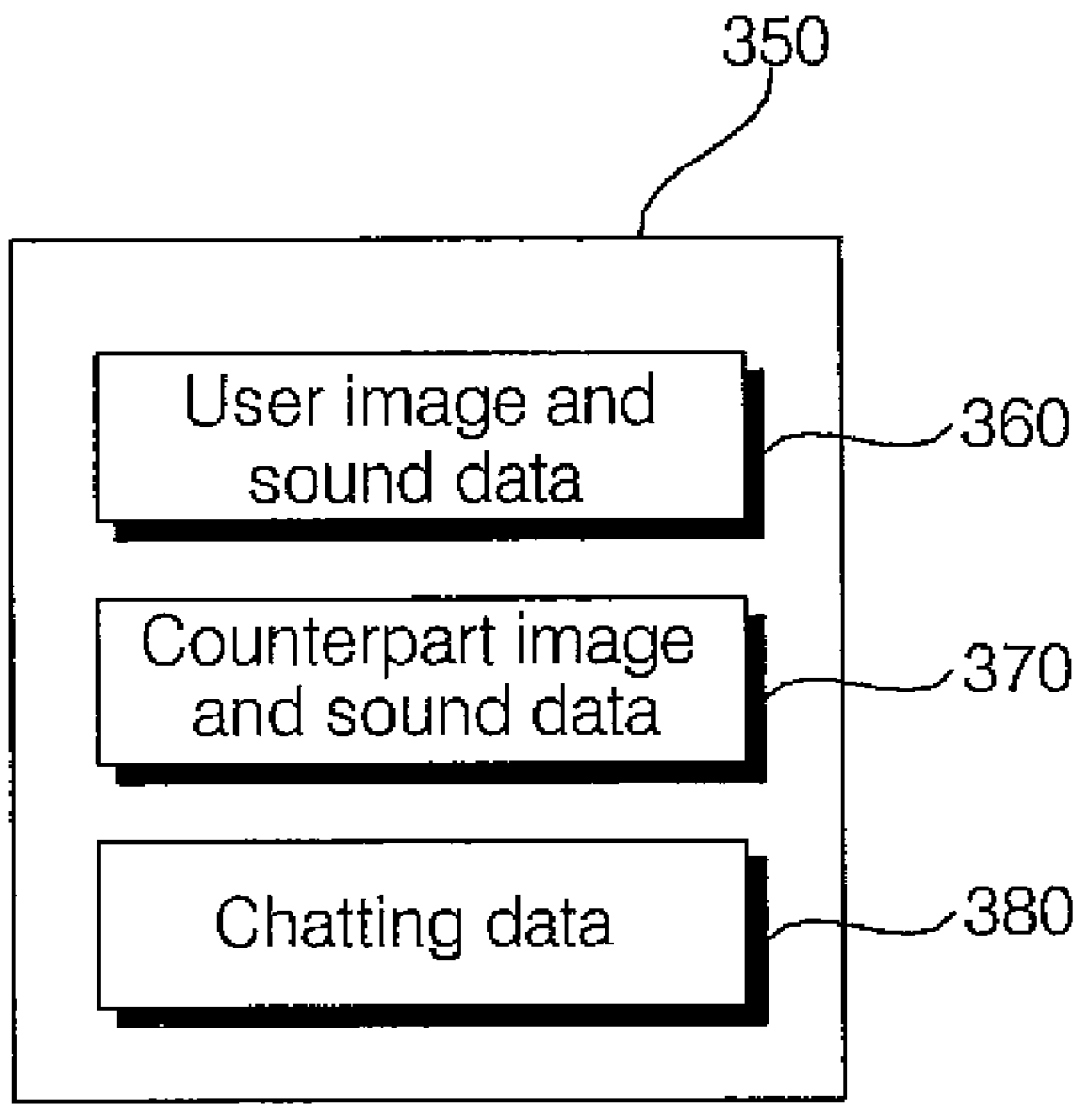
FIG. 7 is an overview illustrating an example of a data configuration of a video chatting log.

FIG. 7 is an overview illustrating an example of a data configuration of a video chatting log 350. As shown, the video chatting log 350 includes a user's image and voice data 360, a counterpart user's image and voice data 370, and chatting data 380 in a single file format. Further, the log 350 also includes a time stamp and thus can be synchronized to other data when being played. Further, an icon corresponding to the video chatting log, which is stored as one file format as described above, can be displayed. Thus, when the user selects the icon, the controller 180 displays the video chatting log. Further, the video chatting log 350 can also be stored together with a telephone number of a counterpart user's device.

Figure 8:
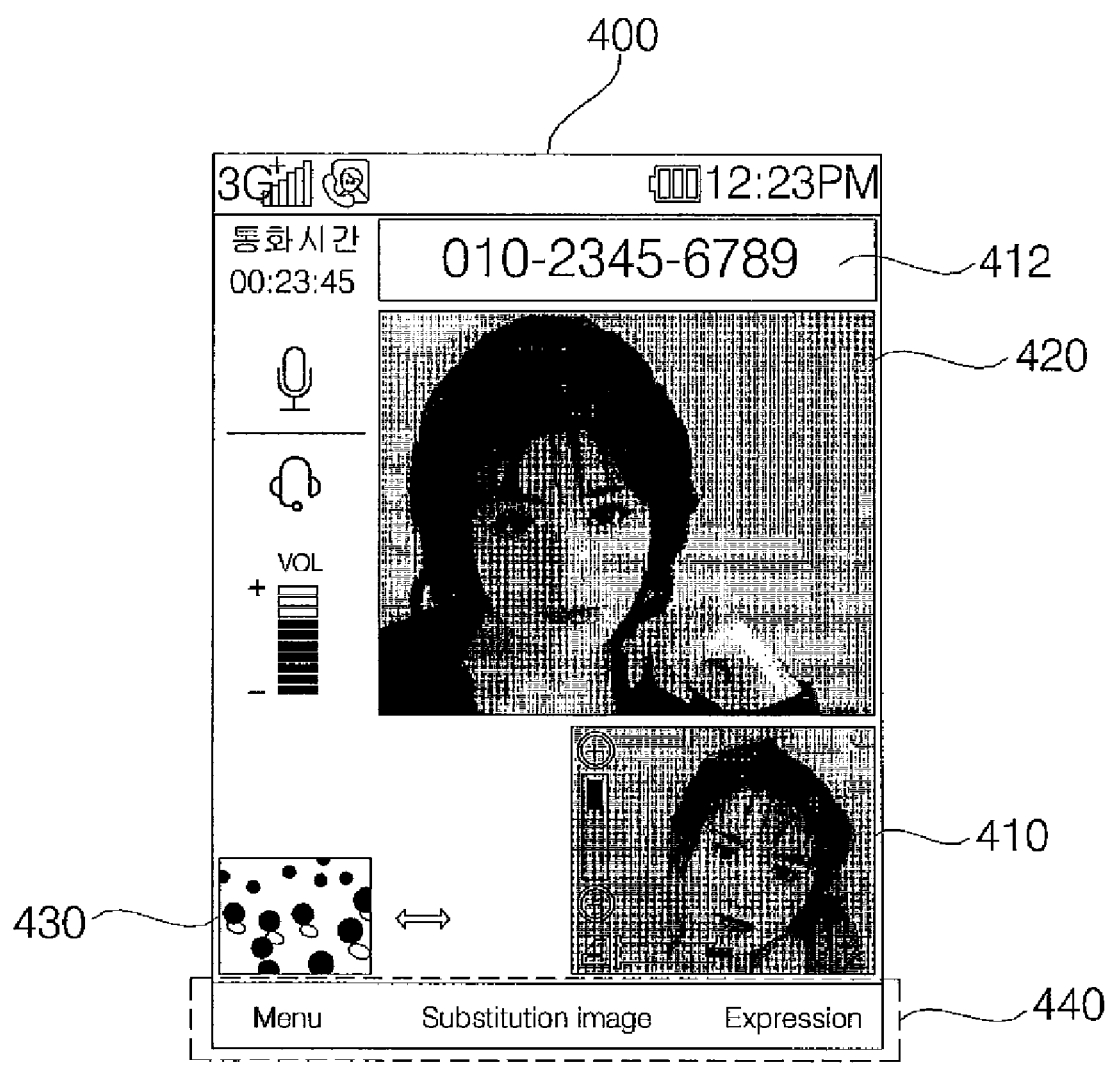
FIG. 8 is an overview illustrating a video telephony screen on a mobile communication device according to an embodiment of the present invention.

Next, FIG. 8 is an overview illustrating a video telephony screen 400 of the display unit 140. As shown, the screen 400 includes a counterpart user's telephone number 412, a counterpart user's image 420 received from the counterpart user's device through the video telephony process, the calling user's image 410 transmitted to the counterpart user's device through the video telephony process, and a substitution image 430, which can be transmitted and exchanged for the user image 420.

The screen 400 also includes a menu item 440 having a list of menu options that may be selected by the user. For example, the user can select the "Substitution image" menu option for transmitting the substitution image 430, and a menu option for transmitting emoticons (expressions) during the video telephony call, etc. Further, as shown on the left and upper portions of the screen 400, icons and other identifiers are displayed and correspond to different operating control states of the terminal.

Figure 9:
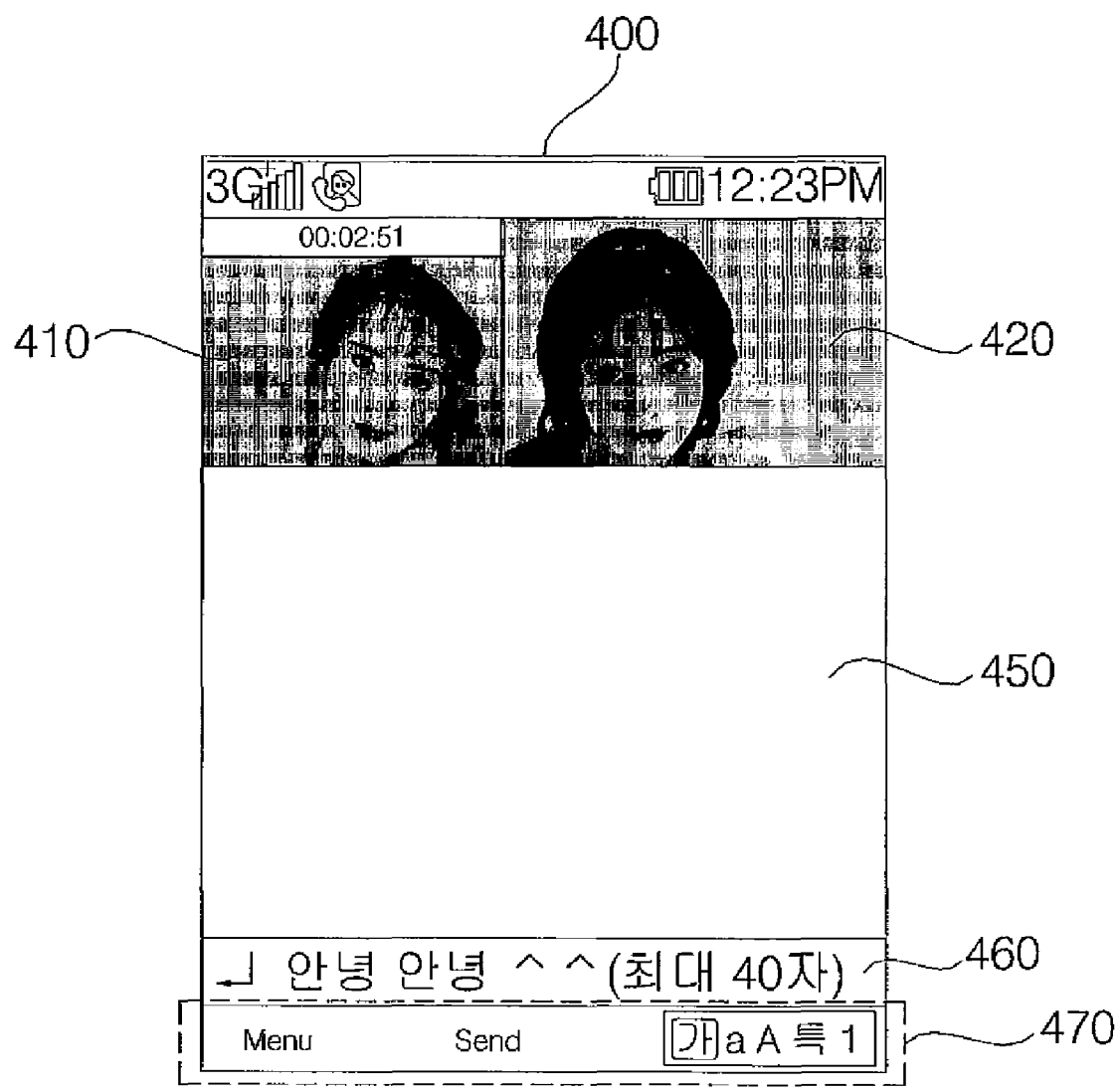
FIG. 9 is an overview illustrating a state of a video telephony screen when a video chatting service is selected according to an embodiment of the present invention.

In addition, FIG. 9 is an overview illustrating a state of the screen 400 when the video chatting service is selected. As shown in FIG. 9, when the video chatting service is selected, the counterpart user's image 410 and the user's image 420 are reduced in size, and moved to an upper side of the screen 400. Further, the controller 180 controls the display unit 140 to display a chatting window 450 and a chatting input window 460 at the center of the screen 400.

The chatting input window 460 is where the user types in text data, etc. and the chatting window 450 is where the typed in text appears. Thus, the two users can conduct a chatting service in which they can enter text data, etc. back and forth to communicate with each other In addition, as shown in FIG. 9, the screen 400 also includes a menu window 470 including a variety of menu options that may be selected by the user. For example, the menu options include a preferred language (English, Korean, Spanish, etc.), and an enter or send menu option to enter the text typed in the chatting input window 460, etc.

Figure 10:
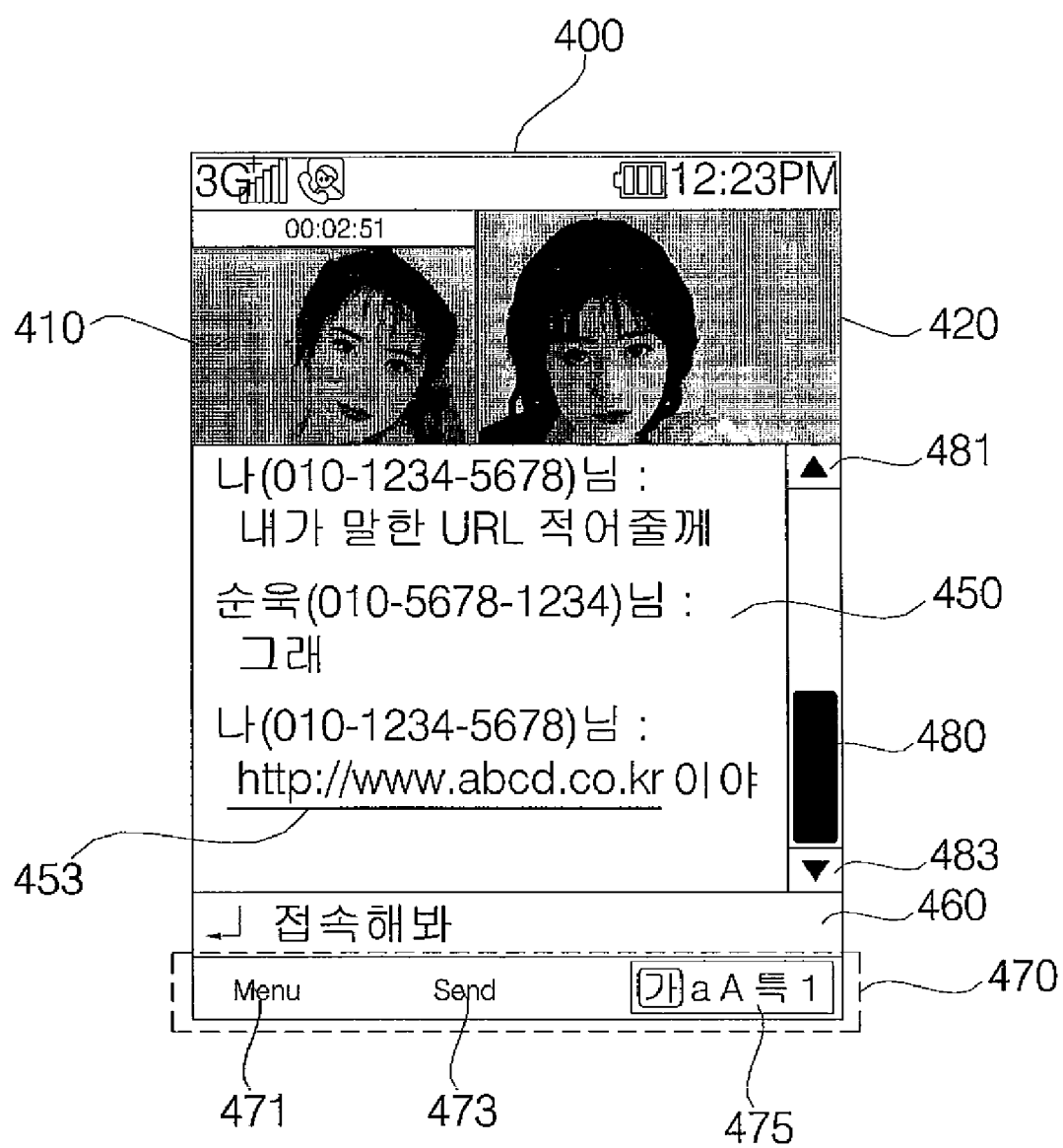
FIG. 10 is an overview illustrating transmitted/received chatting data being displayed in a chatting window according to an embodiment of the present invention.

FIG. 10 is an overview illustrating transmitted/received chatting data being displayed in the chatting window 450. As shown, the screen 400 also includes a vertical scroll bar 480 and scroll arrows 481 and 483 for scrolling through the displayed chatting data. To enter or input data into the chatting window 450, the user can type text or other information into the chatting input window 460 and then press a send menu item 473 displayed at the bottom of the screen 400.

The counterpart device also includes a similar chatting window such that each user can view the text input by the other user and perform a chatting session with each other. Further, as shown in FIG. 10, the user can also input a Uniform Resource Locator (URL) address 453. In this instance, the other user can then select a website corresponding to the URL by selecting the highlighted URL. FIG. 10 also illustrates a call history storage menu option 471 and language menu option 475.

Figure 11:
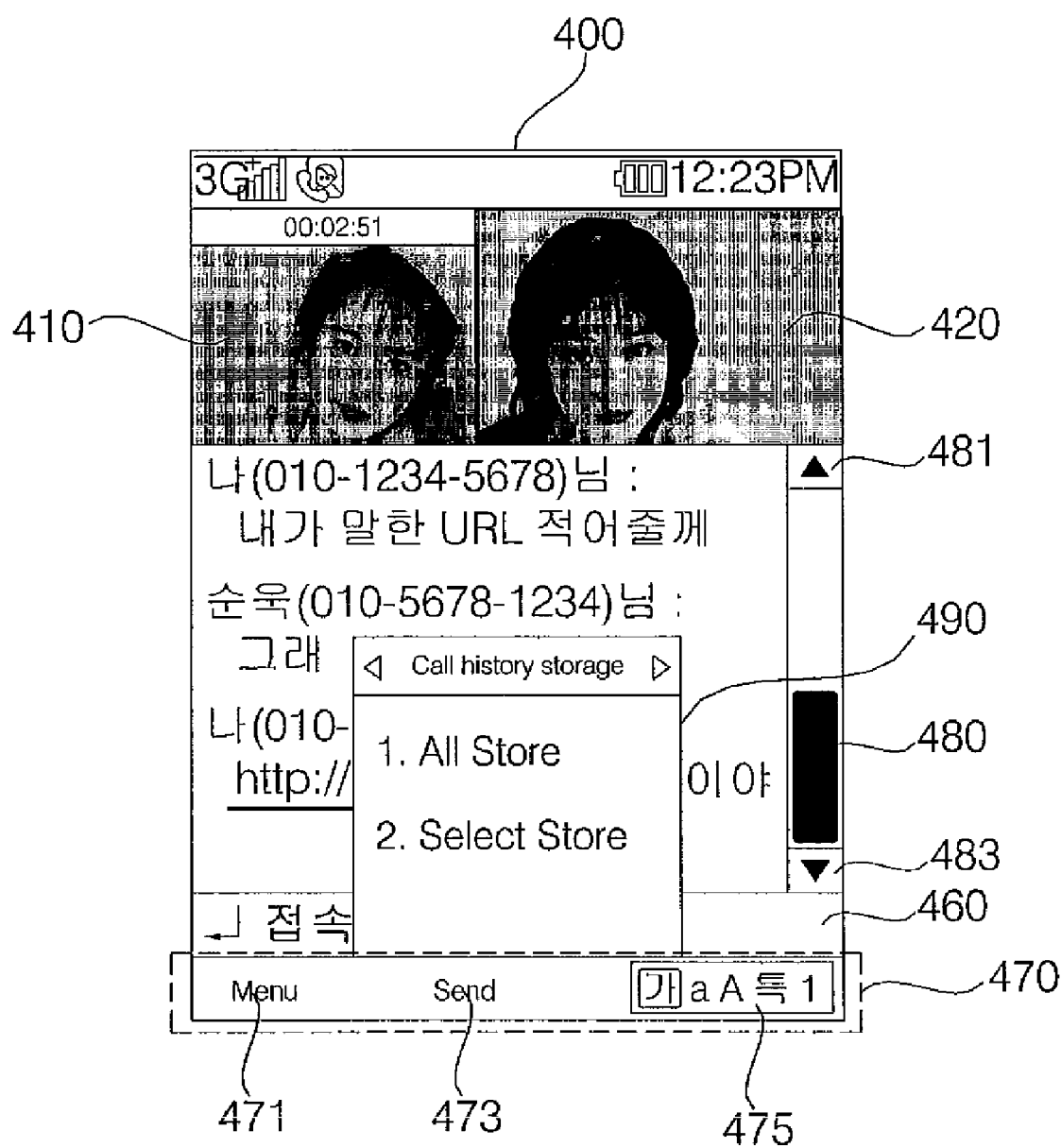
FIG. 11 is an overview illustrating a call history storage menu option being selected during the video chatting process according to an embodiment of the present invention.
Figure 12:
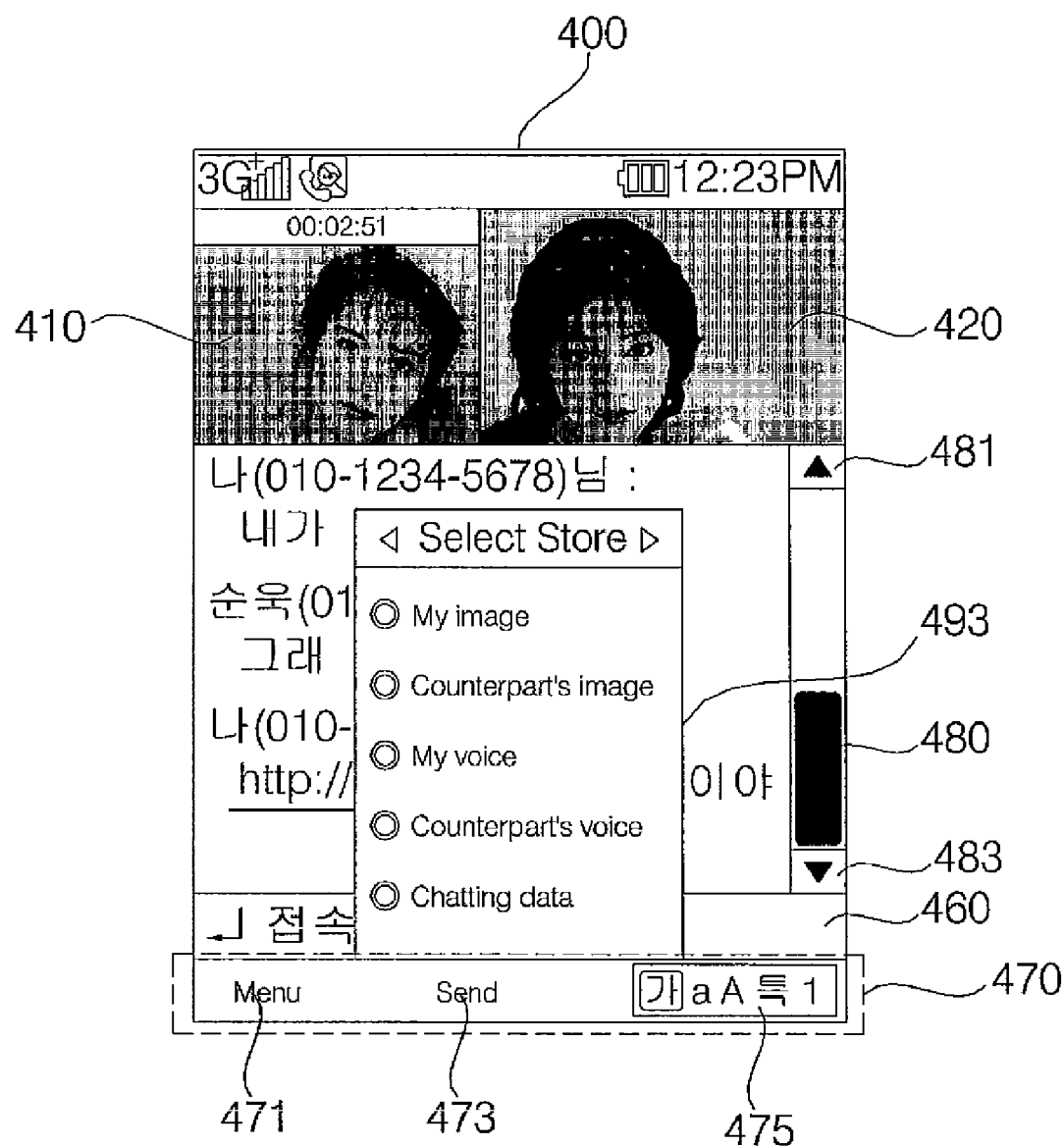
FIG. 12 is an overview illustrating a select storage menu being displayed according to an embodiment of the present invention.

Next, FIG. 11 is an overview illustrating the call history storage menu option 471 being selected during the video chatting process. As shown, when the user selects the call history storage menu option 471, a call history storage menu 490 is displayed. When an item "1. All Store" is selected in the call history storage menu 490, the chatting data, the counterpart user's image data, the counterpart user's voice data, the user's image data, and the user's voice data are all stored together. When an item "2. Select Store" is selected in the call history storage menu 490, a select storage menu 493 is displayed as shown in FIG. 12. Then, when one or more items to be stored are selected in the select storage menu 493, the selected data is stored.

Figure 13:
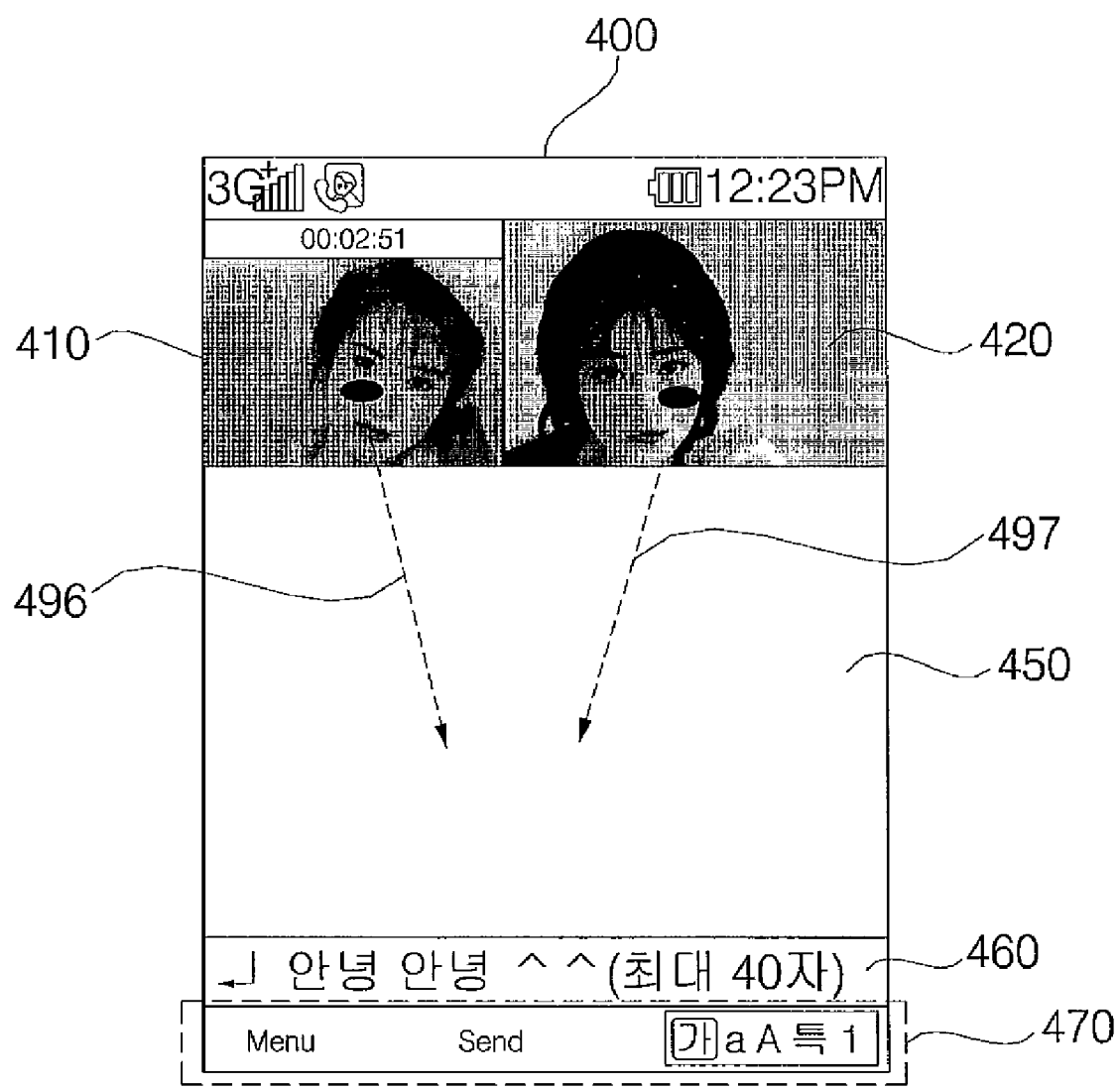
FIG. 13 is an overview illustrating a user selecting image data of a calling party and a called party and linking the selected image data with text data input into a chatting window according to an embodiment of the present invention.

FIG. 13 is an overview illustrating a user selecting the image data of the calling party and the called party and linking this selected image data with text data input into the chatting window 450. In more detail, the user can select the image 410 of the user and drag the image data into text input in the chatting window 450 so that the text is linked and stored together with the touched image data. The touching and dragging operation for the user's image data is represented by the arrow 496. Similar, the user can link the image of the counterpart user with data input in the chatting window 450. The touching and dragging operation for the counterpart user's image data is represented by the arrow 497. Therefore, video data can be easily linked to the chatting data and included in the video chatting log.

Figure 14:
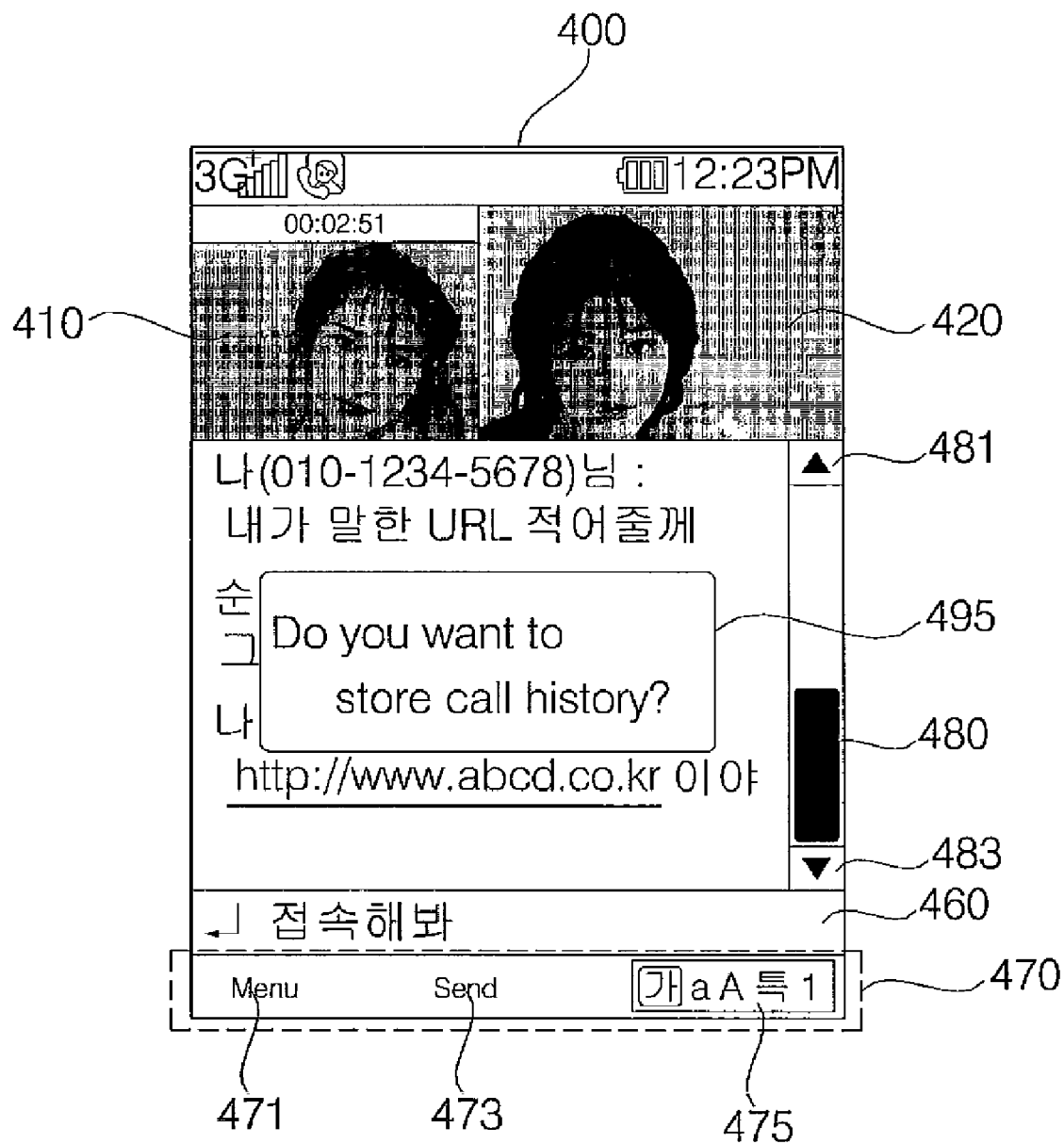
FIG. 14 is an overview illustrating a popup window that asks a user if they want to store a call history after a video chatting process is finished according to an embodiment of the present invention.

Next, FIG. 14 is an overview illustrating a popup window 495 that asks the user if they want to store a call history after the video chatting process is finished. If the user decides to store the call history, one of the call history storage menus shown in FIGS. 12 and 13 is displayed so the user can store the particular data he or she desires.

Figure 15:
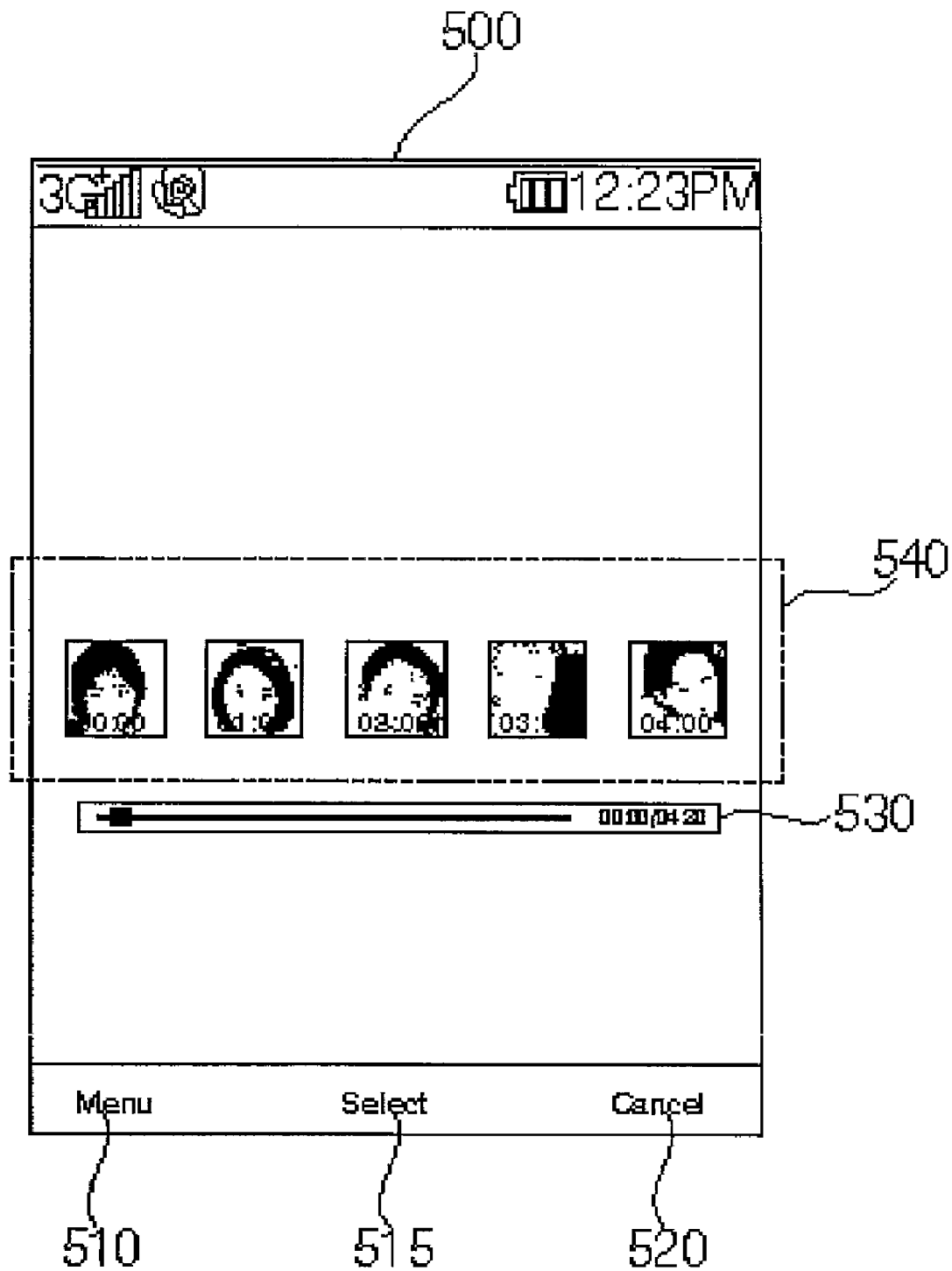
FIG. 15 is an overview illustrating a plurality of thumbnail images that may be selected to store a corresponding video chatting session on a time basis according to an embodiment of the present invention.

In addition, FIG. 15 is an overview illustrating a plurality of thumbnail images that may be selected to store a corresponding video chatting session on a time basis. In more detail, and as shown in FIG. 15, a display screen 500 includes a plurality of thumbnail images 540 that are displayed along with a progress bar 530. The display screen 500 also includes a menu option 510, a select option 515 and a cancel option 520.

Thus, the user can scroll the progress bar 530 to scroll through a plurality of images (thumbnails) of people they previously spoke with via a video call. The user can then select a particular thumbnail image from the thumbnails 540 using the select option 515 to store and link the selected thumbnail image with a corresponding chat session.

Figure 16:
FIG. 16 is an overview illustrating a video chatting list screen in which a video chatting log is stored according to an embodiment of the present invention.

Next, FIG. 16 is an overview illustrating a video chatting list screen 530 in which a video chatting log is stored. Thus, a user can select one of the displayed phone numbers to view a corresponding stored chatting session. As shown in FIG. 16, the screen 530 also includes the menu option 510 for selecting other menus, the select option 515 for selecting one of the displayed items, and the cancel option 520 for canceling a selected item.

Figure 17:
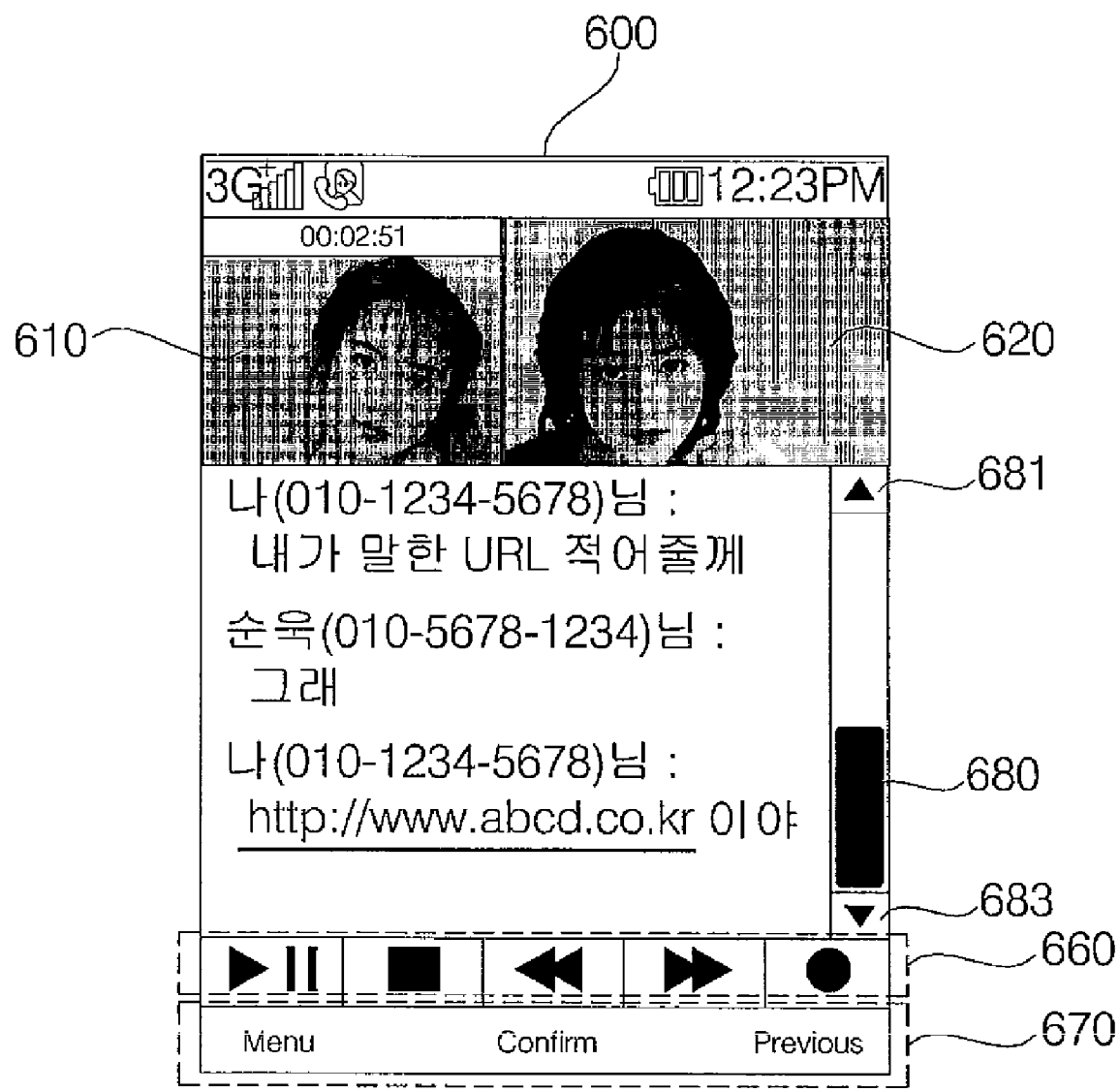
FIG. 17 is an overview illustrating a screen that displays a chat session corresponding to an item selected in FIG. 16 according to an embodiment of the present invention.

FIG. 17 is an overview illustrating a screen 600 that displays a chat session corresponding to an item selected in FIG. 16. As shown, when one of the items displayed on the video chatting list screen 530 in FIG. 16 is selected, the screen 600 including the corresponding chatting log is displayed. As shown, the screen 600 includes the user's image 610, the counterpart user's image 620, and the corresponding chatting data. The screen 600 also include menu options 670 including a menu option for selecting other menus, a menu option for performing a selected item, and a menu option for moving to a previous menu. Further, the chatting data can be scrolled through using the scroll bar 680 and scroll arrows 681 and 683. Thus, the user can view stored chatting data.

In addition, the present invention can be implemented in a recording medium readable by a processor included in a mobile communication device, such as a Mobile Station Modem (MSM), using a code readable by the processor. The recording medium readable by the processor includes all kinds of recording devices in which data readable by the processor are stored. Examples of the recording medium readable by the processor may include ROM, RAM, CD-ROM, a magnetic tape, a floppy disk, an optical data storage and so on. The examples can also include one implemented in the form of a carrier wave such as transmission over an Internet. Further, the recording medium readable by the processor can be distributed in computer systems connected through a network, so codes readable by a processor can be stored and executed in a distributed manner.

As described above, according to embodiments of the present invention, at least one of the user's image data and the counterpart user's image data, which are transmitted/received through video communication, is linked to chatting data and stored as a video chatting log. In addition, the user's voice data and a counterpart user's voice data can also be selectively linked to chatting data and stored as a video chatting log. Accordingly, when playing a video chatting log, a selected one of video data and voice data transmitted/received through video telephony can be played together with chatting data.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of operating a mobile communication device, the method comprising:
   establishing a video telephony call between a first user and at least a second user;
   displaying a first image data of the first user and a second image data of the second user on the mobile communication device, said first and second image data being transmitted/received through the video telephony call;
   displaying a chatting window on the mobile communication device when a video chatting service is selected such that the first and second users can perform a chatting operation in the chatting window;
   displaying a menu for selectively selecting at least one data among the first image data, the second image data, first voice data of the first user and second voice data of the second user of the video telephony call to be stored together with chatting data displayed in the chatting window, when a video chatting log storage option is selected;
linking the chatting data displayed in the chatting window with said selected at least one data; and
storing the linked chatting data as the video chatting log,
wherein the video chatting log includes synchronization information for synchronizing the chatting data and the selected at least one data linked together with the chatting data.

2. The method of claim 1, further comprising:
setting at least one of a storage time point and a storage section with respect to said at least one of the first image data and the second image data linked with said chatting data.

3. The method of claim 2, wherein the storage time point and the storage section are set based on a user command.

4. The method of claim 2, further comprising:
displaying a menu for selecting the at least one of the storage time point and the storage section; and
selecting the at least one of the storage time point and the storage section through a progress bar displayed in the menu.

5. The method of claim 4, wherein the selecting step comprises selecting at least one of the storage time point and the storage section corresponding to a selected thumbnail image among thumbnail images displayed by a predetermined time interval in the menu.

6. The method of claim 1, further comprising:
displaying a chatting input window for inputting the chatting data displayed in the chatting window.

7. The method of claim 1, further comprising:
selecting at least one of the chatting data, the first image data, the first voice data, the second image data, and the second voice data; and
playing the chatting data linked with the selected at least one of the chatting data, the first image data, the first voice data, the second image data, and the second voice data according to the synchronization information.

8. The method of claim 1, further comprising:
notifying the second user that the second image of the second user has been stored by the first user.

9. The method of claim 1, wherein the storing step stores the video chatting log together with a telephone number of a communication device of the second user.

10. The method of claim 1, further comprising:
displaying an icon corresponding the video chatting log; and
playing the video chatting log when the icon corresponding to the video chatting log is selected.

11. The method of claim 1, further comprising:
determining if a communication device of the second user supports the video chatting service; and
displaying a message to the second user informing the second user that the video chatting service is not possible when the determining step determines the video chatting service is not possible.

12. The method of claim 1, further comprising:
selecting a data to be stored together with the chatting data based on a touch and drag input to at least one of a first display window on which the first image data is displayed and a second display window on which the second image data is displayed; and
linking the chatting data with the selected data and storing the linked chatting data as the video chatting log.

13. The method of claim 12, further comprising:
reducing a size of the first display window and the second display window when the chatting window is displayed.

14. The method of claim 12, wherein the selecting step comprises:
selecting the first image data as the data to be stored together with the chatting data if the first display window is touched and dragged into an area of the chatting window, and
selecting the second image data as the data to be stored together with the chatting data if the second display window is touched and dragged into an area of the chatting window.

15. A mobile communication device, comprising:
a radio communication unit configured to establish a video telephony call between a first user of the mobile communication device and at least a second user of another communication device;
a display unit configured to
display a first image data of the first user and a second image data of the second user on the mobile communication device, said first and second image data being transmitted/received through the video telephony call,
display a chatting window on the mobile communication device when a video chatting service is selected such that the first and second users can perform a chatting operation in the chatting window, and
display a menu for selectively selecting at least one data among the first image data, the second image data, first voice data of the first user and second voice data of the second user of the video telephony call to be stored together with chatting data displayed in the chatting window, when a video chatting log storage option is selected;
a control unit configured to link the chatting data displayed in the chatting window with said selected at least one data; and
a memory unit configured to store the linked chatting data as the video chatting log,
wherein the video chatting log includes synchronization information for synchronizing the chatting data and said selected at least one data linked together with the chatting data.

16. The mobile communication device of claim 15, further comprising:
an input unit configured to set at least one of a storage time point and a storage section with respect to said at least one of the first image data and the second image data linked with said chatting data.

17. The mobile communication device of claim 16, wherein the storage time point and the storage section are set based on a user command.

18. The mobile communication device of claim 16, wherein the display unit is further configured to display a menu for selecting the at least one of the storage time point and the storage section, and
wherein the control unit is further configured to select the at least one of the storage time point and the storage section through a progress bar displayed in the menu.

19. The mobile communication device of claim 18, wherein the control unit is further configured to select at least one of the storage time point and the storage section corresponding to a selected thumbnail image among thumbnail images displayed by a predetermined time interval in the menu.

20. The mobile communication device of claim 15, wherein the display unit is further configured to display a chatting input window for inputting the chatting data displayed in the chatting window.

21. The mobile communication device of claim 15, further comprising:
   an input unit configured to select at least one of the chatting data, the first image data, the first voice data, the second image data, and the second voice data,
   wherein the control unit is further configured to play the chatting data linked with the selected at least one of the chatting data, the first image data, the first voice data, the second image data, and the second voice data according to the synchronization information.

22. The mobile communication device of claim 15, wherein the radio communication unit notifies the second user that the second image of the second user has been stored by the first user.

23. The mobile communication device of claim 15, wherein the memory is further configured to store the video chatting log together with a telephone number of a communication device of the second user.

24. The mobile communication device of claim 15, wherein the display unit is further configured to display an icon corresponding the video chatting log, and the control unit is further configured to play the video chatting log when the icon corresponding to the video chatting log is selected.

25. The mobile communication device of claim 15, wherein the control unit is further configured to determine if a communication device of the second user supports the video chatting service, and wherein the radio communication unit is further configured to transmit a message to said another mobile communication device to inform the second user that the video chatting service is not possible when the control unit determines the video chatting service is not possible.

26. The mobile communication device of claim 15, further comprising:
   a touch screen configured to select a data to be stored together with the chatting data based on a touch and drag input to at least one of a first display window on which the first image data is displayed and a second display window on which the second image data is displayed,
   wherein the control unit is further configured to link the chatting data with the selected data and store the linked chatting data as the video chatting log.

27. The mobile communication device of claim 26, wherein the control unit is further configured to reduce a size of the first display window and the second display window when the chatting window is displayed.

28. The mobile communication device of claim 26, wherein the control unit is further configured to:
   select the first image data as the data to be stored together with the chatting data if the first display window is touched and dragged into an area of the chatting window, and
   select the second image data as the data to be stored together with the chatting data if the second display window is touched and dragged into an area of the chatting window.

* * * * *